(12) United States Patent
Lee et al.

(10) Patent No.: US 12,058,134 B2
(45) Date of Patent: *Aug. 6, 2024

(54) SYSTEM FOR PROVIDING CHATBOT SERVICES IN INTEGRATED WAY

(71) Applicant: MindwareWorks Co., Ltd., Seoul (KR)

(72) Inventors: Jae In Lee, Goyang-si (KR); Hyun Sun Cho, Seoul (KR); Seong Kuk Mun, Namyangju-si (KR); Kyung Taek Park, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 254 days.

This patent is subject to a terminal disclaimer.

(21) Appl. No.: 17/700,535

(22) Filed: Mar. 22, 2022

(65) Prior Publication Data

US 2023/0262063 A1    Aug. 17, 2023

(30) Foreign Application Priority Data

Feb. 17, 2022  (KR) .................. 10-2022-0020526

(51) Int. Cl.
*H04L 9/40*       (2022.01)
*H04L 51/02*      (2022.01)

(52) U.S. Cl.
CPC .......... *H04L 63/0884* (2013.01); *H04L 51/02* (2013.01)

(58) Field of Classification Search
CPC ........................... H04L 63/0884; H04L 51/02
See application file for complete search history.

(56) References Cited

U.S. PATENT DOCUMENTS

| | | | |
|---|---|---|---|
| 2019/0012390 A1* | 1/2019 | Nishant | G06N 3/006 |
| 2019/0288963 A1* | 9/2019 | Sugimoto | G06F 3/1203 |
| 2020/0099633 A1* | 3/2020 | D'Agostino | G06F 3/0481 |
| 2020/0342850 A1* | 10/2020 | Vishnoi | G06F 40/30 |
| 2020/0372055 A1* | 11/2020 | Joko | G06F 40/268 |
| 2021/0365482 A1* | 11/2021 | Kim | G06F 13/00 |
| 2022/0353209 A1* | 11/2022 | Yannam | G06F 16/24565 |

FOREIGN PATENT DOCUMENTS

KR    10-2146031 B1    8/2020

* cited by examiner

*Primary Examiner* — Jung W Kim
*Assistant Examiner* — Alan Lingqian Kong
(74) *Attorney, Agent, or Firm* — Revolution IP, PLLC

(57) ABSTRACT

Disclosed is a system for providing chatbot services in an integrated way, in which a client can receive query processing services by immediately accessing at least one of other chatbot servers without changing a preexisting accessing means while being initially connected to a specific chatbot server, so that a user can use a plurality of query processing services without difficulties by linking the chatbot servers operated by the plurality of service providers, thereby minimizing the time, efforts and costs of the user who wants to receive the plurality of query processing services through the plurality of service providers.

3 Claims, 2 Drawing Sheets

SYSTEM FOR PROVIDING CHATBOT SERVICES IN INTEGRATED WAY

CROSS-REFERENCE TO RELATED APPLICATION

This application claims priority from Korean Patent Application No. 10-2022-0020526, filed on Feb. 17, 2022 in the Korean Intellectual Property Office, the disclosure of which is incorporated herein by reference.

BACKGROUND OF THE INVENTION

(a) Field of the Invention

The disclosure relates to a system for providing chatbot services in an integrated way, and more particularly to a system for providing chatbot services in an integrated way, which is convenient for a user to use a plurality of query processing services by linking chatbot servers operated by a plurality of service providers.

(b) Description of the Related Art

Chatbots are being used in various fields such as electronic commerce, banking, etc. to support customer, acquire information, and so on. For example, Bank of America, Starbucks, Disney, and the like companies are employing the chatbots in taking orders and serving customers.

For smooth conversations with the chatbot, there are required pattern recognition technology that enables a machine to recognize a voice, a text, etc. based on artificial intelligence (AI) and big data analytics; natural language processing technology that makes human languages be recognized by a computer and utilized in question and answer, translation, etc.; semantic web technology that enables a computer to understand information and make logical inference from the information; text mining technology that mines useful information from data consisting of texts; context-aware computing technology that anticipates the situation and context of a conversation partner; and so forth.

Such a chatbot system refers to a system implemented to respond to a user through a messenger based on given response rules. The chatbot system is utilized in home shopping, Internet shopping malls, insurance companies, banks, food delivery, accommodation reservations, etc. to answer customer questions or recommend suitable products or services based on the preexisting consumer propensities.

A user may want to receive query processing services by accessing chatbot servers respectively operated by a plurality of service providers. For example, a user may have to ask a chatbot server of Lotte Card Co., Ltd. in succession while receiving a query processing service by accessing a chatbot server of Hyundai Card Co., Ltd., or a user may suddenly wonder about a delivery status of a purchase and ask a chatbot server of a corresponding shopping mall while receiving a query processing service by accessing a chatbot server of a specific bank.

In this case, in a current chatbot service, a user receives the query processing service by accessing the chatbot server of Hyundai Card Co., Ltd. through a dedicated app or browser or the like accessing means of Hyundai Card Co., Ltd., and then terminates the corresponding access. Next, the user has to receive the query processing service again by accessing the chatbot server of Lotte Card Co., Ltd. through the dedicated app or browser or the like accessing means of Lotte Card Co., Ltd.

Consequently, when a user wants to use the chatbot servers respectively operated by the plurality of service providers, there is a disadvantage in that the user has to receive the query processing services by individually accessing the chatbot servers through the individual accessing means.

In relation to technology of using the plurality of chatbot servers, Korean Patent No. 10-2146031 (hereinafter, referred to as the "related art") has proposed a chatbot system based on a multi-domain and a method for providing a chatbot service.

However, the related art merely discloses a chatbot system that, when query processing is not possible with regard to a user's specific query input to a chatbot server, the specific query is transmitted to and processed by an external chatbot server, but does not disclose that a plurality of queries a user wants to ask the plurality of service providers are transmitted to the chatbot servers and the plurality of queries related to the services are more efficiently processed.

SUMMARY OF THE INVENTION

Accordingly, the disclosure is conceived to solve the foregoing conventional problems, and an aspect of the disclosure is to provide a system for providing chatbot services in an integrated way, in which a client can receive query processing services by immediately accessing at least one of other chatbot servers without changing a preexisting accessing means while being initially connected to a specific chatbot server, so that a user can use a plurality of query processing services without difficulties by linking the chatbot servers operated by the plurality of service providers, thereby minimizing the time, efforts and costs of the user who wants to receive the plurality of query processing services through the plurality of service providers.

According to the disclosure as proposed to solve the foregoing problems, a system for providing chatbot services in an integrated way includes: a plurality of chatbot servers operated by a plurality of service providers, and configured to provide a query processing service that generates a response to a query received from a client and transmits the response to the client; a client configured to receive a query processing service by accessing at least one of other chatbot servers while being initially connected to one specific chatbot server among the plurality of chatbot servers; and an integrated operation server configured to store and manage information about the plurality of service providers and the plurality of chatbot servers, and carry out an authentication process by proxy, which enables the client to access at least one of other chatbot servers while being connected to one chatbot server.

Here, the specific chatbot server to which the client is first connected may transmit link information of chatbot servers, which are operated by service providers cooperating in a link service, to the client.

When a user inputs a link intention mark and one of the service providers cooperating in the link service and then inputs a link query, the client may transmit the link query to the chatbot server operated by the service provider for which the input is made The chatbot server that received the link query may request the integrated operation server to identify whether authentication of a user is valid, and the integrated operation server may transmit an authentication validation message and current valid user information to the chatbot server that received the link query when the authentication of the user is valid, and carry out an authentication process through a preset authentication means and then transmit an authentication completion message and new user information obtained in the authentication process to the chatbot server that received the link query when the authentication of the user is invalid.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, embodiments of a system for providing chatbot services in an integrated way according to the disclosure with the foregoing objects, solutions, and effects will be described in detail with reference to the accompanying drawings.

Figure 1:
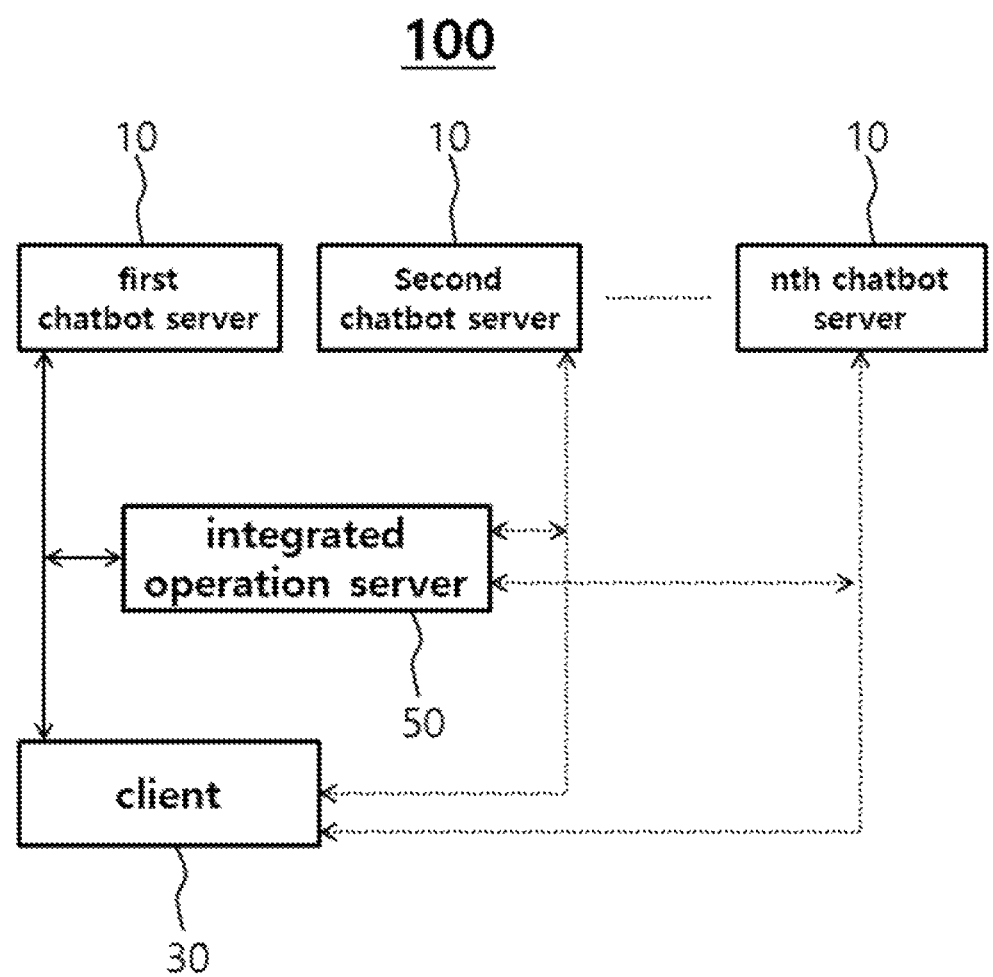
FIGS. 1 and 2 are a block diagram and a detailed block diagram of a system for providing chatbot services in an integrated way according to an embodiment of the disclosure.
Figure 2:
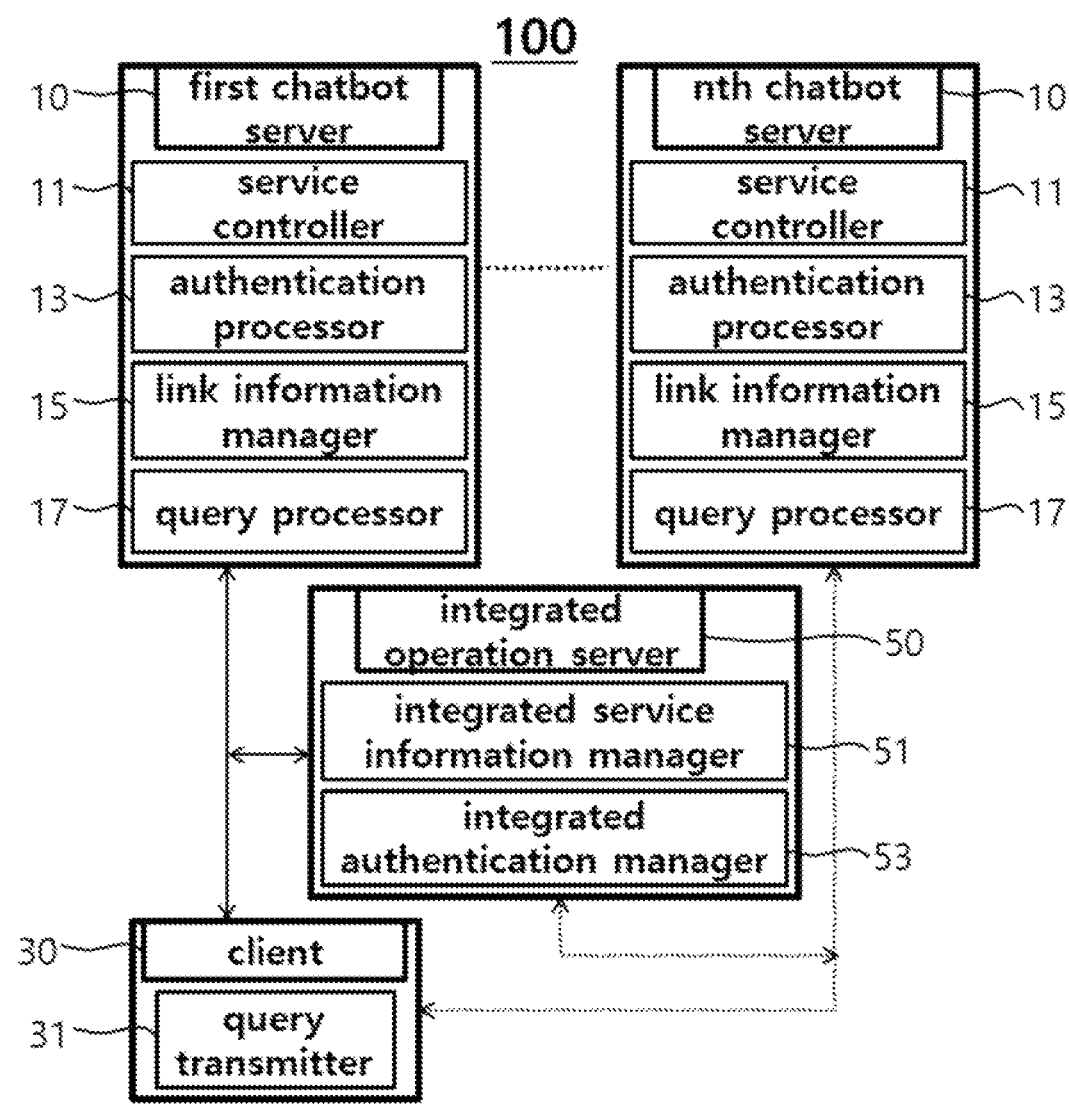

FIG. 1 is a block diagram of a system for providing chatbot services in an integrated way according to an embodiment of the disclosure, and FIG. 2 is a detailed block diagram of a system for providing chatbot services in an integrated way according to an embodiment of the disclosure.

As shown in FIGS. 1 and 2, a system 100 for providing chatbot services in an integrated way according to an embodiment of the disclosure includes a plurality of chatbot servers 10 including a first chatbot server, a second chatbot server, . . . , an nth chatbot server; a client 30 receiving a query processing service by accessing other chatbot servers 10 while being connected to a specific chatbot server 10 among the plurality of chatbot servers 10; and an integrated operation server 50 storing and managing information needed for a service (hereinafter referred to as a "link service") that enables the client 30 to receive the query processing services by accessing other chatbot servers 10 while maintaining the connection with the specific chatbot server 10, and carrying out an authentication process required for the link service by proxy.

The plurality of chatbot servers 10 are operated by the plurality of service providers, and carry out a service that generates a response to a query received from the client 30 and transmits the response to the client 30, in other words, a query processing service. Each chatbot server 10 is operated by each service provider to provide a query processing service related to a variety of business to users.

Each chatbot server 10 basically performs the query processing service corresponding to the service for generating a response to a query received from the client 30 and transmitting the generated response to the client 30, and further allows the client 30, which has received the query processing service by initially connecting with the chatbot server 10, to immediately access other chatbot servers 10 and receive the link service while maintaining the current connection.

For example, the client 30 may use a specific accessing means (e.g., an access dedicated app, a browser, etc. autonomously developed by financial institutions, commerce companies, and the like companies that provide customer services and including chatbot services) to access a first chatbot server 10 and receive a query processing service, and further immediately access at least one of other chatbot servers (e.g., the second chatbot server to the nth chatbot server) and receive the link service with the help of the first chatbot server 10 while maintaining the connection using the current accessing means. In other words, the client 30 can receive a link service by accessing another chatbot server 10 while maintaining the current connection using the specific accessing means, without needing to terminate the specific accessing means for accessing the first chatbot server 10 and use another accessing means for accessing another chatbot server 10 and receiving the link service.

To make the link service possible, the specific chatbot server 10, to which the client 30 is initially connected, performs an operation of transmitting link information about the chatbot servers 10, which are operated by the service providers cooperating in the link service, to the client 30.

Specifically, when the client 30 is connected to the specific chatbot server 10, e.g., the first chatbot server through the specific accessing means, the specific chatbot server 10 transmits the link information, e.g., uniform resource locator (URL) address information about the chatbot servers 10 operated by the service providers cooperating in the link service, to the client 30.

To this end, the chatbot servers 10 stores and manages the service providers cooperating in the link service and the link information (e.g., the URL address information) about the chatbot servers operated by the service providers, which are matched to each other. The service providers and the link information about the chatbot servers, which are stored and managed in the chatbot servers 10, may be stored and managed by various methods. For example, the service providers and the link information about the chatbot servers may be stored and managed as received from the integrated operation server 50, or as updated periodically or when the information is renewed (when there is a change in companies cooperating in the link service, etc.).

As described above, the client 30 can receive a query processing service by accessing at least one of other chatbot servers (e.g., the second chatbot server to the nth chatbot server) while being initially connected to one specific chatbot server (e.g., the first chatbot server) among the plurality of chatbot servers 10. In other words, the client 30 can receive the link service by accessing other chatbot servers while maintaining the connection using the current accessing means.

Here, the client 30 may correspond to one of various terminals or media as long as it can transmit a query to and receive a response from the chatbot server 10 by accessing the chatbot server 10. For example, the client 30 may include a computer, a mobile phone, a smartphone, or the like connectable to a network.

The client 30 uses a specific accessing means to initially access the specific chatbot server 10, for example, a dedicated app or universal browser for accessing the specific chatbot server 10. The client 30 receives the query processing service from the specific chatbot server 10 while being connected to the specific chatbot server 10 through the specific accessing means.

While being connected to the specific chatbot server 10, e.g., the first chatbot server, the client 30 may need to receive the link service by accessing another chatbot server 10, e.g., the second chatbot server. For example, the client 30 may situationally need to receive a query processing service from a chatbot server operated by Lotte Card Co., Ltd. while receiving a query processing service by initially accessing the chatbot server 10 operated by Hyundai Card Co., Ltd. through the dedicated app provided by Hyundai Card Co., Ltd.

In this case, the client 30 may receive the link service by accessing another chatbot server 10 while maintaining the current connection without terminating the current accessing means (e.g., the dedicated app provided by Hyundai Card Co., Ltd. Specifically, when an input for a link query is made to the client 30 by a user after making inputs on a link intention mark and one of the service providers cooperating in the link service, the client 30 performs an operation of transmitting the link query to the chatbot server 10 operated by the service provider corresponding to the input. Here, the link query refers to a query that the client 30 wants to transmit to another chatbot server 10 while being connected to the specific chatbot server 10.

When the client 30 is connected to the specific chatbot server 10 through the specific accessing means, as described above the client 30 receives the service providers cooperating in the link service and the link information about the chatbot servers 10 operated by the service providers from the specific chatbot server 10. Therefore, a user can access another desired chatbot server based on the information received from the specific chatbot server 10, thereby transmitting the link query.

Specifically, the client 30 needs to recognize that a user intends to make the link query to another chatbot server operated by another service provider while maintaining the connection with the specific chatbot server 10. To this end, when a user intends to access another chatbot server 10, the user may first make an input for the link intention mark. A user makes an input for the link intention mark, selects or makes an input for a service provider that operates another chatbot server 10 to which the link query will be made, and then inputs the link query to be transmitted to that chatbot server 10.

When a user makes such inputs, the client 30 may recognize that the user intends to make the link query to that chatbot server 10 based on the link intention mark. Further, the client 30 may identify the input or selected service provider based on the information received from the specific chatbot server 10, and extract the link information (e.g., the URL address information) from the chatbot server 10 being operated by the identified service provider. Consequently, it is possible for the client 30 to transmit the link query to the link information of that chatbot server 10.

In more detail, a user inputs the link intention mark, e.g., "@", selects or inputs one of the service providers cooperating in the link service, and then makes an input for the link query. A user may input the link intention mark, i.e., "@" and then input one of the service providers cooperating in the link service in person. However, when a user inputs the link intention mark, i.e., "@", the client 30 may automatically list the service providers cooperating in the link service so that the user can select and input one of the listed service providers cooperating in the link service. As described above, the service providers cooperating in the link service and the link information of the chatbot servers being operated by the service providers may be stored and managed as received from the specific chatbot server when the client 30 is connected to the specific chatbot server 10.

When a user inputs the link intention mark and one of the service providers cooperating in the link service and then makes an input for the link query, the client 30 sends the link query to the link information of the chatbot server 10 being operated by the input service provider. Therefore, the client 30 can receive a link service by transmitting a link query to another chatbot server 10 while maintaining the current connection.

Like this, when a link query is transmitted to a different chatbot server 10, the different chatbot server 10 performs an authentication process and provides a query processing service that generates a response to the link query and transmits the response to the client 30.

The integrated operation server 50 stores and manages information about a plurality of service providers and a plurality of chatbot servers 10, and performs an operation of carrying out an authentication process, which is performed to access at least one of other chatbot servers 10, by proxy in the state that the client 30 is being connected to one of the chatbot servers 10.

The integrated operation server 50 stores and manages the information about the service providers that want to provide the link service to the client 30. In other words, the service provider previously registers cooperation in the link service to the integrated operation server 50 while registering its own basic information and link information (e.g., URL address information) of a chatbot server it operates in order to provide the link service to the client 30. Then, by the integrated operation server 50, the service providers registered to cooperate in the link service and the link information of the chatbot servers 10 being operated by the registered service providers are transmitted to and stored and managed in each chatbot server 10.

Further, the integrated operation server 50 carries out an operation of the authentication process, which is performed to access at least one of other chatbot servers 10, by proxy while the client 30 is being connected to one of the chatbot servers 10. In other words, when the client 30 being connected to the specific chatbot server 10 accesses another chatbot server and transmits a link query, the integrated operation server 50 carries out the authentication process for the client 30 on behalf of the chatbot server 10 that received the link query.

Like this, the integrated operation server 50 is configured to perform user authentication in an integrated way on behalf of service providers or chatbot servers 10 being operated by the service providers, so that a user can ultimately avoid repetitive authentication processes and the service providers providing the authentication processes can also reduce time, efforts and costs incurred by repeating the authentication processes for the user who has already been validly authenticated just before access.

The chatbot server 10 that received the link query may directly perform the authentication process. However, the chatbot server 10 that received the link query is being operated by the service providers registered to the integrated operation server 50 and cooperating in the link service, and therefore the integrated operation server 50 carries out the authentication process for the client 30 on behalf of the chatbot server 10 that received the link query.

Specifically, the chatbot server 10 that received the link query requests the integrated operation server 50 to identify whether authentication of a user is valid. When the authentication of the user is valid, the integrated operation server 50 transmits an authentication validation message and current valid user information to the chatbot server 10 that received the link query. When the authentication of the user is not valid, the integrated operation server 50 performs an authentication process through a preset authentication means and then transmits an authentication completion message and new user information obtained in the authentication process to the chatbot server 10 that received the link query.

The chatbot server 10 that received the link query does not provide a query processing service by generating a response to the link query, but requests the integrated operation server 50 to identify whether authentication of a user is valid. When the client 30 transmits a link query to the chatbot server 10, the chatbot server 10 receives the link query together with contact information (typically, a user' name, phone number, birth date, and the like information needed to check identification and a real name) of the client 30, and therefore requests the integrated operation server 50 to identify whether the authentication of the user is valid (whether the user is authenticated and whether the authentication is valid) based on the contact information of the client 30.

Then, the integrated operation server 50 identifies whether the authentication of the user is valid (whether the user is authenticated and whether the authentication is valid) with respect to the user of the client 30. Identifying whether a user's authentication is valid is to identify not only whether the user is identical to a user whose authentication has been valid but also whether authentication validity has expired even though the preexisting authentication has been valid. For example, the integrated operation server 50 identifies that authentication of a user is valid when the user has previously been validly authenticated and its authentication validity has not expired. On the other hand, the integrated operation server 50 identifies that authentication of a user is not valid when the user is first connected to the chatbot server 10 that received the link query and thus the authentication has not been valid before or when the authentication validity has expired even though the authentication has been valid.

When it is identified that the authentication of the user is valid, the integrated operation server 50 transmits the authentication validation message and the current valid user information to the chatbot server 10 that received the link query. Because the integrated operation server 50 is storing and managing information about a user whose authentication is valid, i.e., information needed for the authentication of the user (e.g., a phone number, a name, a birth date, etc.), the valid user information being currently stored and managed is transmitted to the chatbot server 10 that received the link query when it is identified that the authentication of the user is valid. Then, the chatbot server 10 that received the link query generates a response to the link query and provides a query processing service by using the user information as basic information.

On the other hand, when it is identified that the authentication of the user is invalid, the integrated operation server 50 performs a user authentication process using the present authentication means, and then transmits an authentication completion message and new user information obtained in the authentication process to the chatbot server 10 that received the link query. The integrated operation server 50 makes the user authentication process be carried out through the authentication means, which is previously set based on the selection of the service provider operating the chatbot server 10 that received the link query, among various authentication means such as Kakao Pay, PASS, Shinhan authentication, KB authentication, public authentication, integrated authentication, etc.

Because the user uses information such as a phone number, a name, birth date, and the like needed for checking a real name and identification to pass the authentication process, the integrated operation server 50 can newly obtain the user's information when the user authentication is completed. Therefore, the integrated operation server 50 identifies that the authentication of the user who newly passed the authentication process is valid, and stores and manages the information about the user whose authentication is valid. Further, when the authentication is completed, the integrated operation server 50 transmits an authentication completion message and new user information obtained during the authentication process to the chatbot server 10 that received the link query. Then, the chatbot server 10 that received the link query generates a response to the link query by using the user information as the basic information and provide the query processing service.

Below, detailed configurations and operations of the chatbot server 10, the client 30 and the integrated operation server 50 in the system 100 for providing chatbot services in an integrated way will be further described according to an embodiment of the disclosure.

The integrated operation server 50 includes an integrated service information manager 51 and an integrated authentication manager 53.

The integrated service information manager 51 is configured to store and manage the basic information of the service providers cooperating in the link service and the link information of the chatbot servers 10 operated by the service providers, which are matched to each other. Therefore, the service providers, which want to cooperate with each other in the link service, are configured to register and store their own basic information and the link information of the chatbot servers they operate to the integrated service information manager 51 of the integrated operation server 50 in advance.

Further, when the service provider registered to cooperate in the link service does not want to share the link service with other service providers, the integrated service information manager 51 stores and manages the information about the service providers, with which the link service is desired not to be shared, as being matched to the service providers registered to cooperate in the link service. Therefore, the service providers which want to cooperate in the link service make other service providers, with which the link service is desired not to be shared, be selectively stored and managed in the integrated service information manager 51 of the integrated operation server 50 in advance. Consequently, it is possible to reflect the intention of the specific service providers which do not want to share the link service with other service providers for various reasons such as competition or the like.

The integrated service information manager 51 may transmit pieces of information being stored and managed, i.e., information (a company name, etc.) about the service provider cooperating in the link service, and the link information of the chatbot server 10 being operated by the service provider to each chatbot server 10. However, when a service provider, with which a specific service provider does not want to share the link service, is selected, the integrated service information manager 51 does not transmit the information of the specific service provider and the link information of the chatbot server the specific service provider operates to the chatbot server 10 the selected service provider operates.

After that, when there is a change due to new registration or withdrawal in the service providers registered to cooperate in the link service, or when there is a change in the link information of the specific chatbot server, or when there is a change in selection of sharing with the link service (when a service provider with which the link service is desired not to be shared is added or deleted), the integrated service information manager 51 may transmit the changed information to each chatbot server 10.

The integrated authentication manager 53 may be configured to store and manage various authentication means (Kakao Pay, PASS, Shinhan authentication, KB authentication, public authentication, integrated authentication, etc.), and store and manage the service providers registered to cooperate in the link service and at least one authentication means selected by those service provides as being matched to each other when the service provider registered to cooperate in the link service selects at least one among various authentication means. Therefore, when the client 30 transmits the link query to the chatbot server 10 operated by the service provider registered to cooperate in the link services, the integrated authentication manager 53 may allow a user of the client 30 to undergo the authentication process through the authentication means stored and managed as being matched to the service provider operating the chatbot server 10 that received the link query.

The integrated authentication manager 53 stores and manages authentication validity of a user, and stores and manages information about the user whose authentication is valid. Therefore, when the chatbot server that received the link query makes a request for identifying whether authentication of a user is valid, it is identified whether the authentication of the user is valid, with reference to the stored and managed authentication validity of the user and the stored and managed information about the user.

In this way, the integrated authentication manager 53 of the integrated operation server 50 performs user authentication in an integrated way on behalf of the service providers or the chatbot servers 10 operated by the service providers, so that a user can ultimately avoid repetitive authentication processes and the service providers providing the authentication processes can also reduce time, efforts and costs incurred by repeating the authentication processes for the user who has already been validly authenticated just before access.

The chatbot server 10 includes a service controller 11, an authentication processor 13, a link information manager 15, and a query processor 17. The service controller 11 controls general operations of the chatbot server 10.

When the client 30 tries accessing the chatbot server 10 through the accessing means, the authentication processor 13 performs the authentication process for a user of the client 30 under control of the service controller 11. In other words, the authentication processor 13 carries out the authentication for a user of the client through at least one of various authentication means such as Kakao Pay, PASS, Shinhan authentication, KB authentication, public authentication, integrated authentication, etc.

The service controller 11 allows the access of the client 30 when the user is authenticated by the authentication processor 13, and provides the query processing service of generating a response through the query processor 17 and transmitting the response to the client 30 when a query is received from the client 30. The query processor 17 may analyze the received query and then generate a response based on a database (not shown) of the service provider, and transmit the generated response to the client 30 under control of the service controller 11, thereby providing the query processing service.

Meanwhile, when a user is authenticated by the authentication processor 13 and the access of the client is allowed, the service controller 11 controls the information (a company name, etc.) about the service providers cooperating in the link service, and the link information of the chatbot servers 10 being operated by the service providers, which are stored and managed in the link information manager 15, to be transmitted to the client 30.

In other words, the link information manager 15 stores and manages the information about the service providers cooperating in the link service, and the link information of the chatbot servers being operated by the service providers, as being matched to each other, and transmits the information to the client 30 under control of the service controller 11. Under control of the service controller 11, the link information manager 15 is connected to the integrated operation server 50, stores and manages pieces of information received from the integrated service information manager 51, and updates the information with changed information received from the integrated service information manager 51 as described above.

The client 30 includes a query transmitter 31. The query transmitter 31 may receive the query processing service by transmitting a query to the specific chatbot server 10 connected via a specific accessing means, and further receive the query processing service by transmitting a link query to another chatbot server 10 while being connected to the specific chatbot server 10.

When the client 30 accesses the specific chatbot server 10 via a specific accessing means, the query transmitter 31 performs an operation of transmitting a query input by a user to the specific chatbot server 10. Meanwhile, when a user inputs the link intention mark such as "@" in the current connection state, the query transmitter 31 recognizes that a user intends to transmit a link query to another chatbot server 10.

When an input for the service provider cooperating in the link service is made after the input of the link intention mark, and then a link query is input, the query transmitter 31 transmits the link query to the link information of the chatbot server 10 operated by the service provider for which the input is made. The query transmitter 31 may transmit the link query to the link information of the chatbot server 10 operated by the service provider, based on the information of the service providers cooperating in the link service and the link information of the chatbot servers operated by the service providers, which are received from the currently connected chatbot server 10.

Meanwhile, a user is highly likely unaware that a service provider to which the link query is desired to be sent is the service provider registered to the integrated operation server 50 and cooperating in the link service. Therefore, when a user inputs the link intention mark such as "@" into an input box, etc, the query transmitter 31 lists the service providers cooperating in the link service, based on the information of the service providers cooperating in the link service and the link information of the chatbot servers operated by the service providers which are received from the currently connected chatbot server 10.

When a service provider to which the link query is desired to be sent is present among the listed service providers cooperating in the link service, a user selects the corresponding service provider. Then, the query transmitter 31 automatically inputs the service provider selected by a user following the link intention mark into the input box. When the service provider is input, a user inputs the link query. Then, the query transmitter 31 transmits the link query to the link information of the chatbot server 10 operated by the service provider with reference to the information of the service providers cooperating in the link service and the link information of the chatbot servers operated by the service providers which are received from the currently connected chatbot server 10. Then, the chatbot server 10 that received the link query performs the authentication process and provides the query processing service for the link query to the client, with the help of the integrated authentication manager 53 of the integrated operation server 50 as described above.

With a system for providing chatbot services in an integrated way according to the disclosure with the foregoing objects, solutions, and effects, a user can use a plurality of query processing services without difficulties by linking the chatbot servers operated by the plurality of service providers, thereby minimizing the time, efforts and costs of the user who wants to receive the plurality of query processing services through the plurality of service providers.

Although a few exemplary embodiments of the disclosure have been shown and described, these are for illustrative purpose only and it will be appreciated by those skilled in the art that changes may be made in these embodiments without departing from the principles and spirit of the invention, the scope of which is defined in the appended claims and their equivalents.

What is claimed is:

1. A system for providing chatbot services in an integrated way, comprising:
   a computing device having a memory configured to store program instructions and one or more processors coupled to the memory, the program instructions comprising:
   a plurality of chatbot servers operated by a plurality of service providers;
   a client, which directly communicated with the plurality of chatbot servers. configured to transmit a query to one of the plurality of chatbot servers,
   wherein a first chatbot server among the plurality of chatbot servers is configured to provide a query processing service that generates a response to the query received from the client and transmits the response to the client,
   wherein the client is configured to receive a link service by accessing a second chatbot server or a nth chatbot server while being connected to the first chatbot server,
   wherein the first chatbot server to which the client is connected is configured to transmit a link information of chatbot servers, which are operated by the plurality of service providers cooperating in the link service, to the client; and
   an integrated operation server configured to store and manage information about the plurality of service providers and the plurality of chatbot servers, and carry out an authentication process by proxy, which enables the client to access at least one of other chatbot servers while being connected to one chatbot server,
   the client, while maintaining the connection with the first chatbot server, is able to access the second chatbot server or the nth chatbot server and receive the link service from the second chatbot server or the nth chatbot server based on the link information transmitted by the first chatbot server.

2. The system of claim 1, wherein, when a user inputs a link intention mark and one of the service providers cooperating in the link service and then inputs a link query, the client transmits the link query to the chatbot server operated by the service provider for which the input is made.

3. The system of claim 2, wherein the second chatbot server or the nth chatbot server that received the link query requests the integrated operation server to identify whether authentication of a user is valid, and the integrated operation server transmits an authentication validation message and current valid user information to the second chatbot server or the nth chatbot server that received the link query when the authentication of the user is valid, and carries out an authentication process through a preset authentication means and then transmits an authentication completion message and new user information obtained in the authentication process to the second chatbot server or the nth chatbot server that received the link query when the authentication of the user is invalid.

* * * * *